United States Patent Office 2,781,381
Patented Feb. 12, 1957

2,781,381

DETERGENT SULPHONIC ACID AND SULPHATE SALTS OF CERTAIN AMPHOTERIC DETERGENTS

Hans S. Mannheimer, New York, N. Y.

No Drawing. Application May 24, 1956,
Serial No. 586,926

4 Claims. (Cl. 260—401)

This invention relates to novel compositions and to methods for making them. In one of its more specific aspects, the invention is directed to methods of making and to novel derivatives of a certain class of amino carboxylic acid metal salts, which I shall hereinafter refer to as "amino acid metal salts."

Said "amino acid metal salts" are useful as surface active agents, are employed as starting materials in the practice of this invention, and have the following general Formula I:

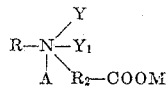

in which R is a hydrocarbon radical of at least 6 carbon atoms and preferably 6–18 carbon atoms, and for most purposes R is preferably such a radical which may be either aliphatic and straight or branch chain or cyclo-aliphatic or aliphatic-aromatic, with the aliphatic portion being attached to an aromatic nucleus and having at least 3 carbon atoms; Y and $Y_1$ are each selected from the class consisting of $R_6$ and $R_2$—COOM; $R_2$ is an organic group selected from the class consisting of (a) aliphatic, aromatic or aromatic-aliphatic hydrocarbon groups of 1–12 carbon atoms, such as —$CH_2$—, —$C_2H_4$—, —$C_3H_6$—, —$C_4H_8$—, $C_5H_{10}$—, —$C_6H_4$—, $C_6H_4CH_2$—, $C_6H_{10}$—, (b) hydroxy substituted aliphatic hydrocarbon groups of 1–12 carbon atoms, illustrative examples of which are

—$CH_2CHOHCH_2$—, —$CH_2CHOHCHOHCH_2$—

(c) aliphatic ether groups, each of said groups having at least one ether oxygen linkage therein and otherwise being hydrocarbon of 2–12 carbon atoms, illustrative examples of which are

—$C_4H_4OCH_2$—, —$(C_2H_4O)_3$—$CH_2$—, —$C_3H_6OCH_2$—

(d) aliphatic ether groups, each of said group having at least one ether oxygen linkage therein and otherwise being hydroxy substituted hydrocarbon of 2–12 carbon atoms, illustrative example of which is

—$CH_2CHOHCH_2OCH_2$—

$R_6$ is selected from the class consisting of monovalent radicals otherwise defined in (a)-(d), examples of which are —$CH_3$, —$C_2H_5$, —$C_3H_7$, —$C_4H_9$, —$C_5H_{11}$, —$C_6H_{11}$, —$C_6H_5$, —$C_6H_4CH_3$, —$C_2H_4OH$, —$CH_2CHOHCH_2OH$ etc., —$C_2H_4OCH_3$, etc.; M is an alkali metal and preferably sodium or potassium; and A is selected from the class consisting of halogens and hydroxyl (OH) and preferably being Cl or OH.

It is to be understood, of course, that Formula I as before set forth is meant to include throughout the present description and claims such salts, as well as inner salts or anhydrides, such as for example:

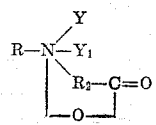

Such "amino acid metal salts" may be prepared in a number of different ways well known to the art:

For example, 1 mole of R—$NH_2$ may be reacted with one mole of $R_6Cl$ and with the use of caustic soda produced HCl is removed to provide

which, in turn, is reacted with an equimolecular proportion of $R_6Cl$ and the produced HCl is removed to provide

One mole of

is reacted with one mole of an alkali metal salt of monochlormonocarboxylic acid either in aqueous or alcohol medium to provide a starting material:

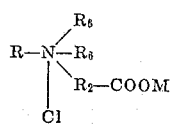

If desired the Cl of such starting materials may be substituted by OH to provide equivalent starting materials by reacting it with an alkali metal hydroxide MOH, whereby Cl is substituted by OH and MCl is formed.

Or, 1 mole of R—$NH_2$ may be reacted with 1 mole of a monohalomonocarboxylic acid together with 2 moles of caustic soda to provide

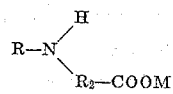

which in turn may be reacted with an equimolecular proportion of a monohalomonocarboxylic acid together with a dimolecular proportion of caustic soda to provide:

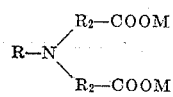

which may also be produced by reacting 1 mole of R—$NH_2$ with 2 moles of a monohalomonocarboxylic acid together with 4 moles of caustic soda. Then 1 mole of

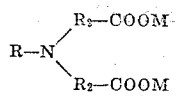

may be reacted with 1 mole of $R_6Cl$ to provide:

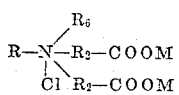

which compound may have the Cl replaced by OH by reaction with MOH.

Or, 1 mole of

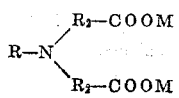

may be reacted with 1 mole of mononochlormonohalocarboxylic acid to provide:

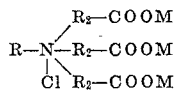

which if desired may have its Cl replaced by OH by the use of caustic soda.

The monohalocarboxylic acids employed are preferably monochloracetic, monochlorpropionic, monochlorlactic, and the alkali employed is preferably NaOH or KOH.

The following Examples A–I and A–1 to I–1 are given merely by way of illustrating in general methods which may be employed for producing examples of starting materials employed in the practice of this invention, such methods being known to the art and, as such, are no part of this invention.

*Example A*

1 mole of $C_{12}H_{25}$—$NH_2$ is reacted with 1 mole of methyl chloride and then reacted with NaOH to remove the HCl formed to provide

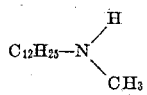

and 1 mole proportion thereof is reacted with 1 mole of methyl chloride and then reacted with NaOH to provide

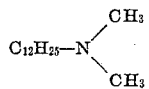

and then 1 mole proportion thereof is reacted with 1 mole of sodium salt of monochloracetic acid to provide:

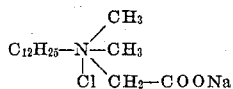

hereinafter known as product A and which may be reacted with an equimolecular proportion of NaOH to provide a compound the same as product A, except that the Cl thereof is replaced by OH and such compound is hereinafter known as product A–1.

*Example B*

1 mole of hexyl benzyl amine:

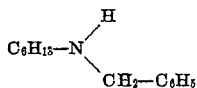

is reacted with 1 mole of monochlorlactic acid, together with 2 moles of sodium hydroxide to provide:

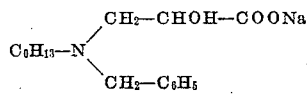

then 1 mole thereof is reacted with one mole of sodium salt of monochloracetic acid to provide:

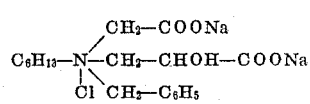

hereinafter known as product B and which may be reacted with an equimolecular proportion of NaOH to replace Cl with OH and is hereinafter known as product B–1.

*Example C*

1 mole of lauryl phenyl amine:

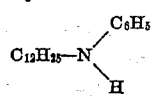

is reacted with 1 mole of monochlorethoxyacetic acid together with 2 moles of caustic soda to provide:

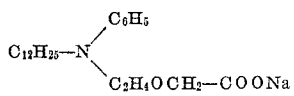

then 1 mole thereof is reacted with 1 mole of sodium salt of monochloracetic acid to provide:

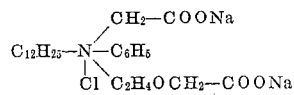

hereinafter known as product C which may be treated with an equimolecular proportion of caustic soda to replace the Cl to OH to provide product C–1.

*Example D*

1 mole of $C_9H_{19}$—$C_6H_4$—$NH_2$ may be reacted with ethylene chlorhydrin in the presence of caustic soda to provide:

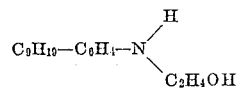

and 1 mole thereof may be reacted with 1 mole of acetic acid together with 2 moles of caustic soda to provide:

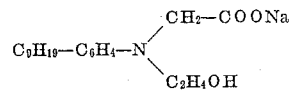

Said compound is then reacted with an equimolecular proportion of sodium salt of monochloracetic acid to provide:

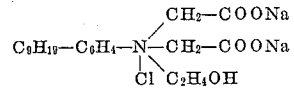

hereinafter known as product D which may be treated with equimolecular proportion of NaOH to replace Cl with OH and is hereinafter known as product D–1.

*Example E*

1 mole of diethoxyamine is reacted with $C_{12}H_{25}Br$ and the HBr is reacted with NaOH. The resulting organic compound is reacted with 1 mole of monochlorpropionic acid, together with 2 moles of caustic soda or with acrylonitrile and subsequently hydrolized, to provide:

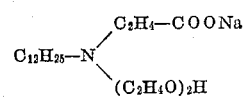

and 1 mole thereof is reacted with 1 mole of sodium salt of monochloracetic acid to provide:

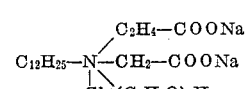

hereinafter known as product E which may be reacted with equimolecular proportion of NaOH to replace Cl with OH to provide product E–1.

*Examples F and G*

1 mole of $C_{12}H_{25}$—$NH_2$ is reacted in the presence of 2 moles of NaOH with the following respective compounds:

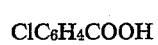

and

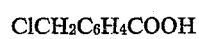

to provide the respective compounds which may be respectively reacted with equimolecular proportion of monochloracetic acid in the presence of dimolecular proportion of NaOH, and the resulting compounds subsequently reacted with equimolecular proportion of sodium salt of monochlorpropionic acid to provide:

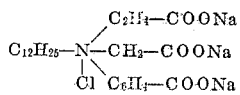

and

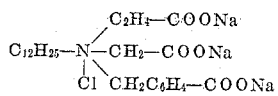

hereinafter known as products F and G respectively, which may be reacted with equimolecular proportion of NaOH to replace Cl with OH to provide compounds hereinafter known as products F–1 and G–1 respectively.

*Example H*

1 mole of

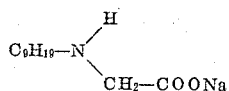

is reacted with glycerine chlorhydrin and with the use of caustic soda, and the resultant organic reaction product is reacted with an equimolecular proportion of sodium salt of monochloracetic acid to provide:

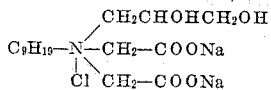

hereinafter known as product H which may be reacted with equimolecular proportion of NaOH to replace Cl with OH and provide product H–1.

*Example I*

1 mole of $C_9H_{19}$—$C_6H_4$—$NH_2$ is reacted with 2 moles of monochloracetic acid, together with 2 moles of KOH to provide:

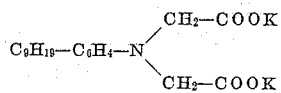

and 1 mole thereof is reacted with 1 mole of potassium salt monochlorpropionic acid to provide:

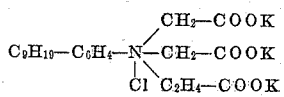

This compound, hereinafter known as product I, may be reacted with 1 mole KOH to replace the Cl thereof with OH to provide compound hereinafter known as product I–1.

The radical R of all of the formulas hereinbefore and hereinafter set forth is that hereinbefore defined in connection with Formula I. Instead of employing monochloracetic acid, any other appropriate monohalomonocarboxylic acid, such as monochlorpropionic, monochlorlactic acids, etc. may be employed. Thus, by merely substituting the particular monohalomonocarboxylic acid for those used in the production of the particular compounds hereinbefore set forth, and/or by employing the various radicals and groups for $R_6$ and $R_2$ but within the definitions thereof as heretofore defined, a very great number of products X, examples of which are products A to I and A–1 to I–1, are "amino acid metal salts," which may be employed as starting materials or reactants in the practice of this invention.

Prior to this invention, it was known that cationic surface active agents and anionic surface active agents when together in aqueous solution resulted in the production or formation of water-insoluble compounds; and that adding an anionic surface active agent to an aqueous solution of another anionic surface active agent resulted in a mere physical combination of said agents and that no reaction would occur between them.

Said "amino acid metal salts" normally behave anionically in aqueous solutions having a pH above 7, and consequently it was expected that said "amino acid metal salts" when in aqueous solution together with anionic surface agents that they would be combined physically only and that no chemical reaction would occur therebetween. In the course of my experimentations, I have discovered that said "amino acid metal salts" could be reacted with certain anionic surface active agents at a pH above 7 to produce water-soluble reaction products. Not only did I make said discovery, but I further discovered that water solutions of such reaction products had viscosities greater than corresponding aqueous solutions of the "amino acid metal salts" and also exhibited better foaming characteristics than did said "amino acid metal salts" in very low dilutions under extreme water hardness conditions. Said reaction products are non-toxic and non-irritating to the human skin. They have been found eminently useful as general utility detergents, such as for car washing, dish washing, clothes washing, etc. Said "amino acid metal salts," as well as compounds of Formula II hereinafter described and such "amino acid metal salts" and compounds of Formula II in mere physical mixtures, when used as components of shampoos cause stinging and sometimes slight irritation of the eyes when such shampoos were used and water solutions thereof accidentally reached the eyes. I have further discovered that the reaction products of this invention caused practically no irritation or stinging of the eyes when employed as components of shampoos.

According to this invention, one or a combination of two or more of said "amino acid metal salts" of the general structural Formula I are reacted with one or a combination of two or more anionic surface active agents of the following general structural Formula II to provide novel, water-soluble compounds having the following general structural Formula III, and having high wetting, detergency and surface active properties and capable of providing voluminous and stable foams in aqueous solutions, and which aqueous solutions are substantially non-irritating to the skin and eyes of normal human beings.

FORMULA II

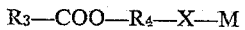

FORMULA III

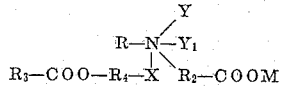

wherein $R_3$ is selected from the group consisting of (a) aliphatic and aliphatic-aromatic hydrocarbon radicals of 6–18 carbon atoms, with the aliphatic-aromatic hydrocarbon radicals, each having an aliphatic radical of at least 6 carbon atoms; $R_4$ is selected from the group consisting of (b) aliphatic hydrocarbon groups of 1–12 carbon atoms, (c) hydroxy substituted aliphatic hydrocarbon groups of 1–12 carbon atoms, (d) aliphatic ether groups, each of said groups having at least one oxygen linkage therein and otherwise being hydrocarbon of 2–12 carbon atoms, (e) hydroxy substituted aliphatic ether groups, each of said groups having at least one ether oxygen linkage therein, and otherwise being hydroxy substituted hydrocarbon of 2–12 carbon atoms, (f) aliphatic groups, each group containing a —CONH— linkage therein and otherwise being hydrocarbon of 2–12 carbon atoms; X is a radical selected from the group consisting of $SO_3$ and $OSO_3$; R, $R_2$, Y, $Y_1$ and M have heretofore been defined.

According to this invention, I react a compound of Formula I with a compound of Formula II to provide the novel and highly useful compounds of Formula III. In general, this reaction is carried out in a solution containing compounds I and II and to which a quantity of an acidic agent such as a strong mineral acid, as for example hydrochloric, sulphuric or its equivalent has been added to lower the pH of the solution to a value of approximately 7 to approximately 9 and while maintaining the mass at a temperature between approximately 100°–200° F. to form a water-soluble salt which will not cause stinging of the eyes when used as shampoo component. The resultant solution can be used directly as a surface active agent, wetting agent or detergent. While the quantities of the compound of Formula I and compound of Formula II may be equimolecular for good yield of compounds of Formula III, I may employ an excess of either and in general the mole ratio for compound of Formula I to compound of Formula II may be 2 moles of the former to 1–3 moles of the latter.

One of the specific methods which I prefer to employ in carrying out an aspect of this invention is to first dissolve a compound of Formula I in water and then the pH thereof is adjusted to approximately 12–13 (measured electrically) by the addition of aqueous caustic soda if required. The temperature of said solution is raised to 100°–200° F. and preferably in factory practice to 140° F. Then a quantity of a compound of Formula II is dissolved in water in a separate container and this solution is added to said first solution and the mass is maintained in said temperature range while being constantly stirred and an acidic agent is added thereto to reduce the pH thereof to a value below 10 and in the range of approximately 7 to 9, and preferably of approximately 8.2 to approximately 8.7. At the end of the acidic agent addition, the stirring is continued and the temperature of the mass maintained for about 10–20 minutes after which the solution is allowed to cool and is a finished product.

The following are specific examples merely given by way of illustrating the invention and are not to be taken by way of limitation, all parts being given by weight unless otherwise specified.

*Example 1*

An aqueous solution of 330 parts of product A in 570 parts of water is heated to approximately 140° F. and its pH (measured electrically) is adjusted by the addition of aqueous caustic soda to 12–13. While being constantly stirred and maintained at that temperature there is added a solution of 350 parts of:

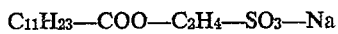

in 525 parts of water. Then while stirring and the temperature is maintained there is added thereto between about 30–40 parts of hydrochloric acid solution (32%) whereby the pH of the mass is lowered to a value in the range of 8.2 to 8.7. Stirring is continued and the temperature maintained for about 10 minutes more. The resultant product is a solution of the novel reaction product having the following formula:

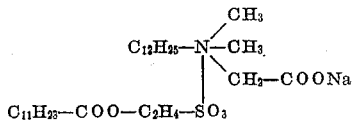

*Example 2*

Employ the same procedure and components as set forth in Example 1, except that only 150 parts of $C_{11}H_{23}$—COO—$C_2H_4$—$SO_3$—Na are used. In this instance the resultant product is a solution of the novel reaction product whose structural formula is shown in Example 1 together with unreacted product A used, in the approximate proportion of 2 parts of the former to 1 of the latter.

Employ the same procedure as that set forth in Example 1, but employ the components indicated in the following Examples 3–36; the quantity of hydrochloric acid solution (32%) is variable to lower the pH to values indicated in Example 1 to obtain the novel reaction products of said Examples 3–36.

*Example 3*

409 parts of product B in 615 parts of water. 310 parts of:

in 460 parts of water.

FORMULA OF NOVEL REACTION PRODUCT

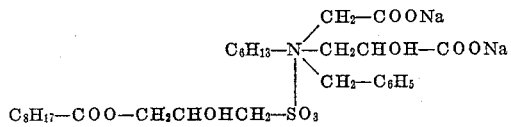

*Example 4*

410 parts of product C in 615 parts of water. 475 parts of:

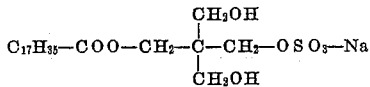

in 750 parts of water.

FORMULA OF NOVEL REACTION PRODUCT

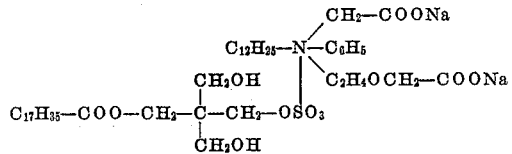

*Example 5*

384 parts of product D in 576 parts of water. 360 parts of:

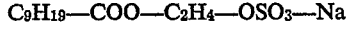

in 600 parts of water.

FORMULA OF NOVEL REACTION PRODUCT

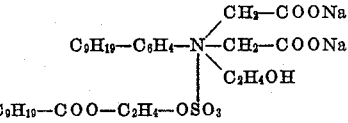

*Example 6*

470 parts of product E in 705 parts of water. 400 parts of:

in 600 parts of water.

FORMULA OF NOVEL REACTION PRODUCT

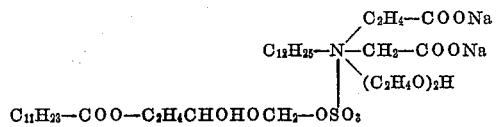

*Example 7*

530 parts of product F in 795 parts of water. 500 parts of:

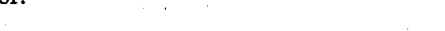

in 600 parts of water.

FORMULA OF NOVEL REACTION PRODUCT

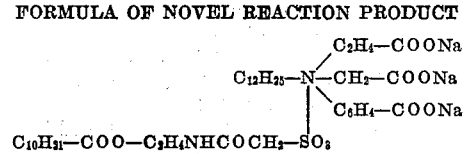

Example 8

544 parts of product G in 816 parts of water. 500 parts of:

$$C_6H_{13}-COO-C_2H_4OC_2H_4OC_2H_4-OSO_3-Na$$

dissolved in 750 parts of water.

FORMULA OF NOVEL REACTION PRODUCT

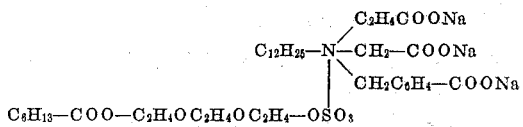

Example 9

230 parts of product H in 345 parts of water. 420 parts of:

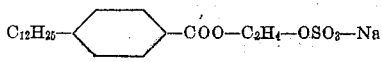

in 650 parts of water.

FORMULA OF NOVEL REACTION PRODUCT

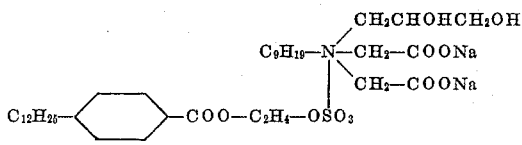

Example 10

602 parts of product I in 903 parts of water. 400 parts of:

$$C_{17}H_{35}-COO-C_2H_4-SO_3-Na$$

in 600 parts of water.

FORMULA OF NOVEL REACTION PRODUCT

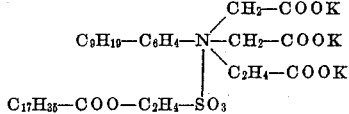

Example 11

480 parts of product A in 720 parts of water. 390 parts of:

$$C_{11}H_{23}-COO-C_2H_4NHCOCH_2-SO_3-Na$$

in 600 parts of water.

FORMULA OF NOVEL REACTION PRODUCT

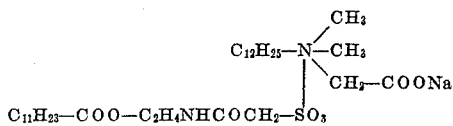

Example 12

480 parts of product A in 720 parts of water. 360 parts of:

$$C_{11}H_{23}-COO-CH_2CHOHCH_2-OSO_3-Na$$

in 500 parts of water.

FORMULA OF NOVEL REACTION PRODUCT

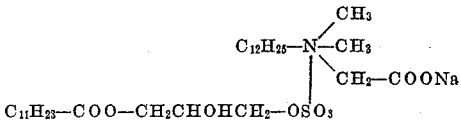

Examples 13–36

1 mole parts of each of the respective sulfate and sulfonate sodium salts of Examples 1, 11 and 12 in a quantity of water measuring one and one half times the weight thereof. 1 mole part of respective products B–I in one and one-half times their weight of water to provide 24 additional novel reaction products in which the specific sulfate and sulfonate radicals replace the halogens of said products B–I.

It is to be understood that when either $SO_3$ or $OSO_3$ is used in the specification or claims, it is meant to indicate either one or the other because of their obvious equivalency; it is also to be understood that the use of Na in the specification and claims is meant to indicate any of the other alkali metals because of their obvious equivalency, and it is also to be understood that the CONH linkage when part of $R_4$ in the specification and claims is meant to indicate either it or NHCO because of their obvious equivalency.

It is also to be understood that instead of first adjusting the pH of the compound of Formula I to 12–13 before the addition of the compound of Formula II, any other method may be employed to obtain the condition whereby the pH of the solution of I and II is at least 10 and preferably 10.5–11 before the addition of the acidic agent to lower the pH of the mass to approximately 7 to approximately 9. For example, I and II may be dissolved together and this solution may by the addition of caustic soda when required have its pH adjusted to at least 10, and then at 100°–200° F. is ready for the addition of the acidic agent to lower its pH to approximately 7 to approximately 9. If desired, the required amount of acidic agent may be added either before or after the solution at pH at least 10 is brought to a temperature in the range of 100–200° F.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention which as a matter of language might be said to fall therebetween.

This application is a continuation-in-part of my co-pending application Ser. No. 575,300, filed April 2, 1956.

I claim:

1. A compound of the following formula:

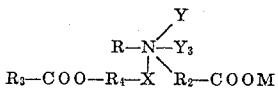

in which R is a hydrocarbon radical selected from the group consisting of aliphatic hydrocarbon radicals of 6–18 carbon atoms, aliphatic-aromatic hydrocarbon radicals of 6–18 carbon atoms, with the aliphatic portion thereof having at least 3 carbon atoms; Y and $Y_1$ are each selected from the class consisting of $R_6$ and $R_2$—COOM; $R_2$ is selected from the class consisting of (a) aliphatic and hydroxy substituted aliphatic hydrocarbon groups of 1–12 carbon atoms, (b) aliphatic ether groups, each group having at least one ether oxygen linkage therein and otherwise being hydrocarbons of 2–12 carbon atoms, (c) aliphatic ether groups, each group having at least one ether oxygen linkage therein and otherwise being hydroxy substituted hydrocarbons of 2–12 carbon atoms, (d) aromatic and aromatic-aliphatic hydrocarbon groups whose maximum number of carbon atoms is 12; $R_6$ selected from the class consisting of monovalent radicals otherwise defined in (a)–(d); $R_3$ is selected from the group of (a–1) aliphatic and aliphatic-aromatic hydrocarbon radicals of 6–18 carbon atoms, with the aliphatic-aromatic hydrocarbon radicals, each having an aliphatic radical of at least 6 carbon atoms; $R_4$ is selected from the group consisting of (b–1) aliphatic hydrocarbon groups of 1–12 carbon atoms, (c–1) hydroxy substituted aliphatic hydrocarbon groups of 1–12 carbon atoms, (d–1) aliphatic ether groups, each of said groups having at least one ether oxygen linkage therein and otherwise being hydrocarbon of 2–12 carbon atoms, (e–1) hydroxy substituted aliphatic ether groups, each of said groups having at least one ether oxygen linkage therein, and otherwise being hydroxy substituted hydrocarbon of 2–12 carbon atoms, (f–1) aliphatic groups, each group containing a —CONH— linkage therein and otherwise being hydrocarbon of 2–12 carbon atoms; X is a radical selected from the group consisting of $SO_3$ and $OSO_3$; and M is an alkali metal.

2. A compound of the following formula:

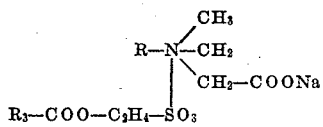

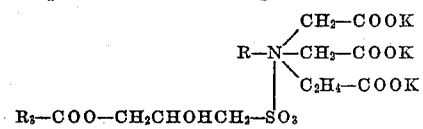

in which R is hydrocarbon of 6–18 carbon atoms and $R_3$ is aliphatic hydrocarbon of 6–18 carbon atoms.

3. A compound of the following formula:

in which R is hydrocarbon of 6–18 carbon atoms and $R_3$ is aliphatic hydrocarbon of 6–18 carbon atoms.

4. A compound of the following formula:

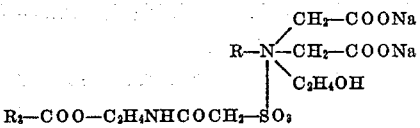

in which R and $R_3$ are each aliphatic hydrocarbon of 6–18 carbon atoms.

References Cited in the file of this patent

UNITED STATES PATENTS

| | | |
|---|---|---|
| 2,103,872 | Schoeller et al. | Dec. 28, 1937 |
| 2,619,467 | Isbell | Nov. 25 1952 |

OTHER REFERENCES

Freese et al.: American Perfumer, "Shampoo Uses," March 1956, pages 37–40.